(12) United States Patent
Vergote

(10) Patent No.: US 8,826,816 B2
(45) Date of Patent: Sep. 9, 2014

(54) METHOD FOR CLEARING A BLOCKAGE IN THE INTAKE DUCT OF A SQUARE BALER

(75) Inventor: Stijn Vergote, Tielt (BE)

(73) Assignee: CNH Industrial America LLC, New Holland, PA (US)

(*) Notice: Subject to any disclaimer, the term of this patent is extended or adjusted under 35 U.S.C. 154(b) by 75 days.

(21) Appl. No.: 13/387,445

(22) PCT Filed: Jul. 15, 2010

(86) PCT No.: PCT/EP2010/060228
§ 371 (c)(1),
(2), (4) Date: Apr. 5, 2012

(87) PCT Pub. No.: WO2011/012457
PCT Pub. Date: Feb. 3, 2011

(65) Prior Publication Data
US 2012/0186463 A1    Jul. 26, 2012

(30) Foreign Application Priority Data
Jul. 28, 2009 (BE) .................................. 2009/0456

(51) Int. Cl.
*A01F 15/10* (2006.01)
(52) U.S. Cl.
CPC ..................................... *A01F 15/101* (2013.01)
USPC ............................... 100/3; 100/7; 100/188 R
(58) Field of Classification Search
USPC ........... 100/189; 56/16.6, 341–344, 362–364, 56/437, 438, 440, 443, 446
See application file for complete search history.

(56) References Cited

U.S. PATENT DOCUMENTS

| 4,106,267 | A | | 8/1978 | White | |
|---|---|---|---|---|---|
| 4,569,282 | A | * | 2/1986 | Galant | 100/189 |
| 4,644,862 | A | * | 2/1987 | Young | 100/189 |
| 4,825,760 | A | * | 5/1989 | Weddeling | 100/188 R |
| 5,467,702 | A | * | 11/1995 | Naaktgeboren et al. | 100/35 |
| 6,050,074 | A | * | 4/2000 | Clostermeyer | 56/341 |
| 6,474,228 | B1 | * | 11/2002 | Leupe et al. | 100/45 |
| 6,543,342 | B2 | * | 4/2003 | Leupe et al. | 100/45 |
| 6,553,902 | B2 | * | 4/2003 | Leupe et al. | 100/45 |
| 6,647,706 | B2 | * | 11/2003 | Vogt et al. | 56/341 |
| 6,786,143 | B2 | * | 9/2004 | Leupe et al. | 100/4 |
| 6,862,876 | B2 | * | 3/2005 | Amstel Van et al. | 56/341 |
| 6,915,736 | B2 | * | 7/2005 | Leupe et al. | 100/45 |
| 7,047,719 | B2 | * | 5/2006 | Dubois | 56/341 |
| 7,287,365 | B2 | * | 10/2007 | Dubois | 56/341 |
| 8,561,532 | B2 | * | 10/2013 | Bergmann | 100/189 |
| 2012/0179338 | A1 | * | 7/2012 | Dresher | 701/50 |
| 2013/0104512 | A1 | * | 5/2013 | Duenwald et al. | 56/341 |

FOREIGN PATENT DOCUMENTS

| DE | 102005046552 | * | 4/2007 | A01F 15/10 |
|---|---|---|---|---|
| EP | 636308 A1 | * | 2/1995 | A01F 15/10 |
| NL | 1037453 C | * | 5/2011 | A01F 15/10 |

* cited by examiner

*Primary Examiner* — Shelley Self
*Assistant Examiner* — Leonel Vasquez
(74) *Attorney, Agent, or Firm* — Patrick M. Sheldrake; Seyed V. Sharifi T.

(57) ABSTRACT

Upon detecting a blockage in the intake duct of a square baler, the path of the tines is temporarily modified from the normal path to a path whereby only a fraction of the crop material accumulated in the intake duct is loaded into the baling chamber. Subsequently the path of the tines is restored to the normal path.

8 Claims, 3 Drawing Sheets

METHOD FOR CLEARING A BLOCKAGE IN THE INTAKE DUCT OF A SQUARE BALER

This application is the US National Stage filing of International Application Serial No. PCT/EP2010/060228 filed on Jul. 15, 2010 which claims priority to Belgium Application BE2009/0456 filed Jul. 28, 2009, each of which is incorporated herein by reference in its entirety.

TECHNICAL FIELD

The present invention relates to agricultural balers for the formation of square bales of crop material, such as hay, straw or silage in a bale chamber.

BACKGROUND OF THE INVENTION

In a conventional baler, as shown for example in U.S. Pat. No. 4,106,267, hay, straw, silage or similar crop material that has been previously cut, windrowed or swathed, is picked up from the ground by a pick-up unit, fed into a duct by a packer unit and loaded in successive batches or charges into an elongated bale chamber by tines of a stuffer unit in timed sequence with a reciprocating plunger. The plunger compresses the material into bales and, at the same time, gradually advances the bales towards the outlet of the bale chamber. As the bales reach a predetermined length as determined by a metering device, a knotter device is actuated which wraps cord, twine or other flexible binding material around the bale and secures the ends of the binding material together. Instead of a packer unit it is also known to use for example a rotor cutter unit which chops the crop material into smaller pieces.

The packer or rotor unit pre-compresses the crop material in the precompression chamber against a backstop formed by the plunger, when closing off the entrance of the bale chamber. The stuffer unit is designed to transfer charges of the crop material quickly into the bale chamber within the short interval during which the reciprocating plunger clears the entrance of the bale chamber. Typically this is accomplished by a fork assembly of which the arms are rotatably connected to cranks, the arms being provided with longitudinally extending slots in which stationary journals are received. A uniform revolution of the cranks makes the arms shift along and pivot about the journals so that the tines of the fork travel along a generally kidney-shaped path with a varying speed. The maximum or peak speed is obtained when the distance between the connection to the cranks and the stationary journals reaches its minimum, since the arms then act as levers with very close fulcrum points. Such a system permits a quick sweep of the material behind the packer unit through the duct and to the entrance of the bale chamber.

This type of stuffer unit was originally designed for the baling of dry, low density material such as straw or hay, but meanwhile there has been an important shift in agriculture from the use of hay to the use of silage. Silage grass can also be baled, but since it has a higher humidity, a higher density and generates higher friction forces with the walls of the precompression chamber than the other crop materials, the load on the components of the stuffer unit increases accordingly.

A stuffer overload protection, will be triggered if for example a plug of crop material is formed in the precompression chamber, especially during the baling of silage. A conventional protection is the use of a shear bolt assembly in the drive line of the stuffer unit. When the loads exceed the shear strength of the bolt, the stuffer is disconnected before its components are damaged. The shearbolt can be replaced relatively easy, but in certain cases it will not be possible to restart the normal operation of the baler as the stuffer unit will not be able to remove the crop material in the precompression chamber without activating the overload protection. In this case it will cost the operator valuable time to render the baler operable again, because it will be required to clear the precompression chamber manually before the baler can be restarted. Furthermore this is a job that requires extensive safety precautions and it is very difficult to gain access to the intake duct of the precompression chamber.

BRIEF SUMMARY OF THE INVENTION

It is therefore desirable upon detection of an overload condition to be able to clear the blockage of the precompression chamber without the need to clear the intake duct manually.

According to a first aspect of the present invention, there is a provided a method for clearing a blockage in the intake duct of a square baler which comprises:
  a baling chamber with an inlet for the introduction of crop material
  an intake duct for transporting crop material to the inlet; and
  a stuffer comprising tines movable to follow a generally kidney shaped path to load the crop in the intake duct into the baling chamber through the inlet, characterised in that the method comprises the steps of:
  detecting a blockage in the intake duct;
  temporarily modifying the path of movement of the tines from the normal path to a path whereby only a fraction of the crop material accumulated in the intake duct is loaded into the baling chamber; and
  restoring the path of the tines to the normal path.

After the path of movement of the tines has been restored to its normal setting, it is possible to perform a further cycle of the stuffer mechanism without picking up more crop material to transfer the remainder of the slice that caused the blockage into the baling chamber. It is also possible simply to resume normal operation so that the crop remaining in the intake duct forms part of the next slice to be loaded into the baling chamber.

According to a second aspect of the present invention, there is provided a square baler for performing the method according to the first aspect of the invention, characterised in that the tines of the stuffer are movable by means of a mechanical linkage of which the geometry is variable to modify the path of the tines.

BRIEF DESCRIPTION OF DRAWINGS

The invention will now be described further, by way of example, with reference to the accompanying drawings, in which.

DETAILED DESCRIPTION OF THE INVENTION

The preferred embodiment of the invention is implemented as a modification of the stuffer mechanism described in EP 0 636 308. The accompanying FIG. 1 and in part FIG. 2 correspond to the same figures of EP 0 636 308, and the remainder of the same specification is hereby imported herein by reference to avoid unnecessary repetition.

Figure 1:
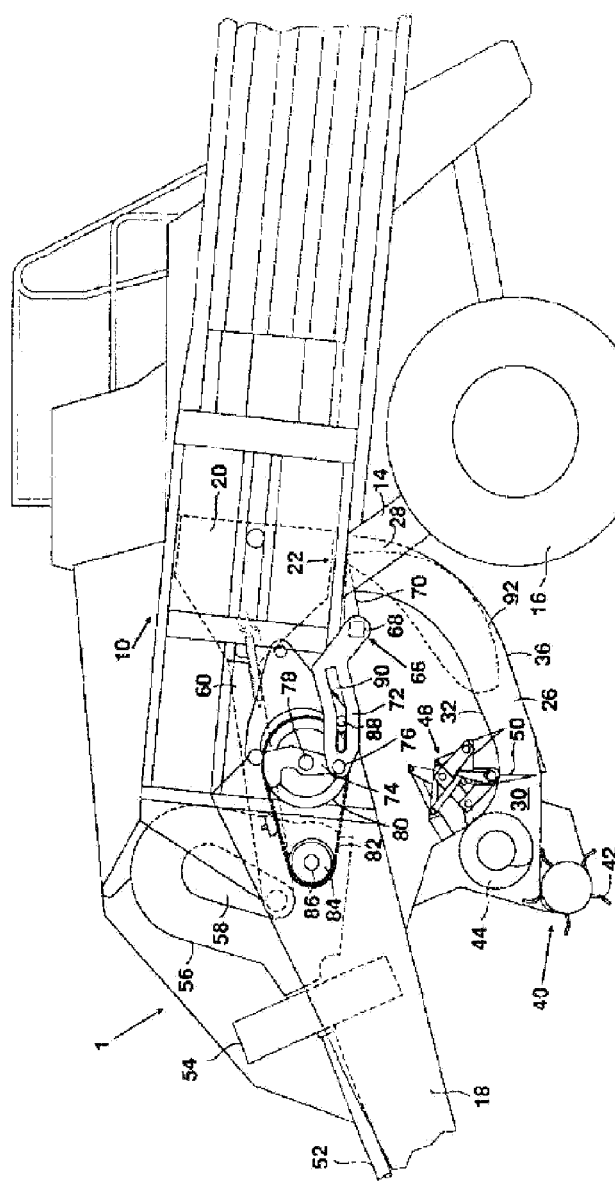
FIG. 1 is a fragmentary diagrammatic side elevation of a baler comprising an intake duct and a stuffer arranged beneath a bale case.

FIG. 1 shows a baler 1 having a fore-and-aft extending bale case 10 with a rectangular cross section defining a baling chamber. The bale case 10 is supported in an upwardly and forwardly inclined manner by struts 14 having ground-engaging wheels 16 at their lowermost ends. A downwardly and forwardly projecting drawbar 18 at the front of the bale case 10 is adapted for hitching the baler 1 to a towing vehicle (not shown) for advancing the same across a field. An enclosed plunger 20 reciprocates fore-and-aft within the baling chamber for periodically compacting material presented to the chamber through an inlet 22 in the floor 24 of bale case 10 across the full width thereof.

An upwardly curved loading or intake duct 26 depends from the bale case 10 and has its upper discharge end 28 in registration with the inlet 22, while the lower receiving end 30 of the duct 26 is remote from inlet 22 and is disposed substantially forwardly thereof. The duct 26 has a curved top wall 32 which is provided with laterally spaced, longitudinal slots (not shown) extending over its full length, and a solid curved bottom wall 36. The lower end 30 of the duct is positioned directly behind a crop pick-up 40 which may be of any design capable of picking up windrowed or swathed crop material from the field and delivering the crop material rearwardly into the end 30 of the duct 26. In the illustrated embodiment, the pick-up 40 has a series of lifting tines 42 that sweep the crop upwardly to stub augers 44 which gather the crop centrally and deliver it rearwardly into the lower end 30 of the duct 26.

A packer unit 48 is positioned directly behind the crop pick-up 40 and above the duct end 30 for making a pre-compressed charge of material within the duct 26 preparatory to loading the bale case 10. The packer unit 48 comprises a plurality of forks with tines 50 which are moved along a generally kidney-shaped path (not shown) to thereby project into the crop material in the lower end 30, push charges of the crop material rearwardly and upwardly in the duct 26 and retract from the duct 26 while returning to their foremost position.

Alternatively instead of the packer unit 48 there can be provided a known rotor cutter system which chops the crop and projects it into the intake duct 30.

A power input shaft 52 along the drawbar 18 carries a flywheel 54 at the upper end of the drawbar 18, immediately adjacent a right angle gearbox 56 coupled with the input shaft 52. The gearbox 56 drives a pair of crank arms 58 which are rotatably linked to a pair of pitman arms 60 of the plunger 20. When rotating power from the towing vehicle is supplied to the input shaft 52, the gearbox 56 rotates the crank arms 58 to cause the plunger 20 to reciprocate within the bale case 10. The same gearbox 56 drives a shaft 86 of a sprocket 84. Other output shafts (not shown) of the gearbox 56 provide either directly or indirectly driving power to the packer unit 48, the pick-up 40 and the stub augers 44.

Behind the packer unit 48 and above the intake duct 26 there is mounted a stuffer comprising a stuffing fork 66 for periodically sweeping an accumulated charge of crop material from the duct 26 into the bale case 10. The fork 66 has a transverse square tube 68 spanning the duct 26 above the latter, to which tube 68 a series of laterally spaced-apart, elongated tines 70 is attached. It is clear that the tube 68 can alternatively be formed as for example a round tube or as having an other suitable section. The tines 70 are spaced apart in accordance with the slots in the top wall 32 of duct 26, such that during the loading cycle the tines 70 may enter the duct 26 through said slots and move along the bottom wall 36 toward the inlet 22 of the bale case 10.

The fork 66 also includes a pair of levers 72 at opposite ends of the tube 68, which levers 72 carry the square tube 68 at their rearmost end and are rotatably coupled at their foremost end with a pair of cranks 74 through pivots 76. The cranks 74 are rigidly affixed to opposite ends of a shaft 78 that spans the bale case 10 above the packer unit 48. The crank 74 on the left side of the baler 1 is also rigidly connected by a shear bolt (not shown) to a large sprocket 80, which receives driving power from an endless chain 82 entrained around the drive sprocket 84, carried by the drive shaft 86. It is clear that other known arrangements are possible to deliver driving power to the stuffing fork 66. It is for example possible to use gearboxes. In this manner the foremost or operated end of each lever 72 is mounted for movement in a circular path of travel about the axis of shaft 78.

According to a known alternative embodiment the shearbolt for the stuffer is located in the lever 72 where it connects this lever 72 with the tines 70. When the shearbolt breaks the tines 70 are pivoted away from the intake duct 30 by means of springs around a pivot point in the region of tube 68.

Figure 2:
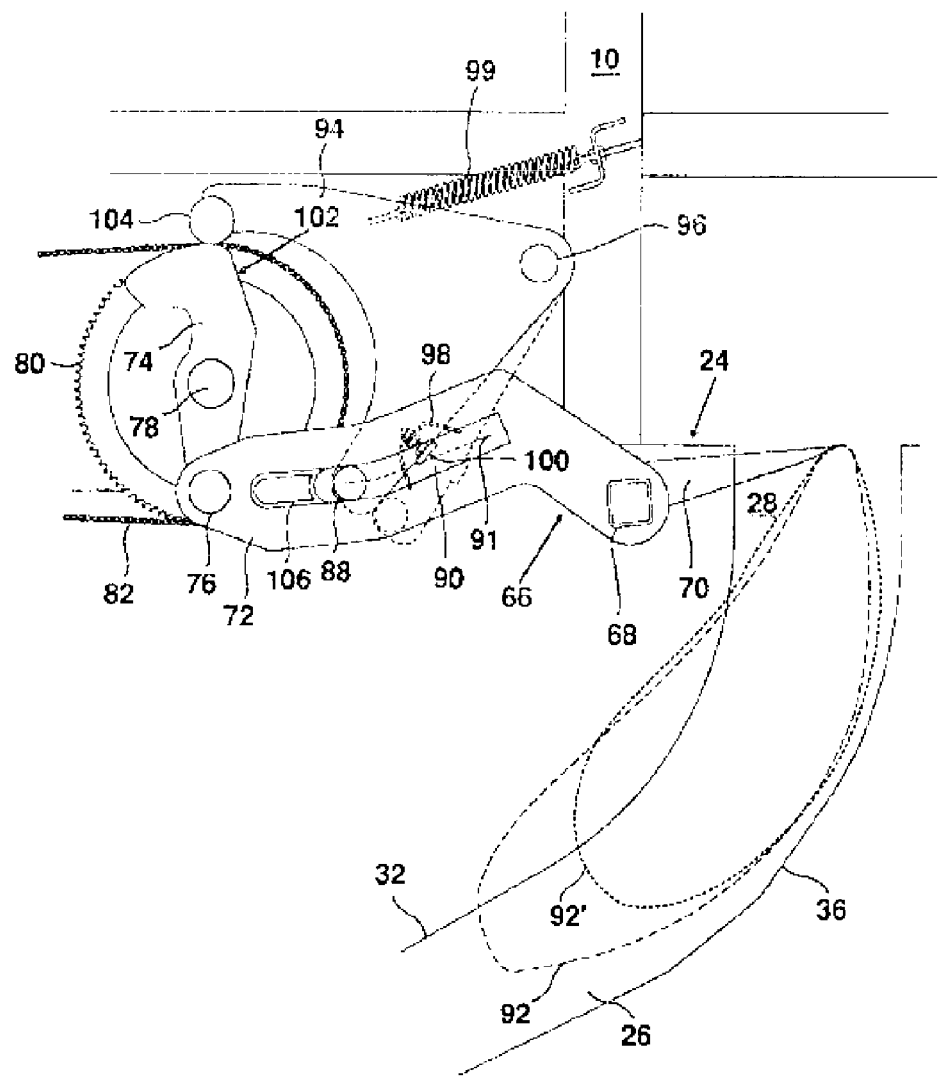
FIG. 2 is an enlarged side view of the stuffer.

As more clearly shown illustrated in FIG. 2, the rearward ends of the levers 72 are guided by a pair of journals 88, which serve as lever fulcrums, engaged in longitudinally extending slots 90 in the levers 72. The journals 88 fit closely within the sides of the slots 90 so as to make the journals 88 follow a predetermined path 91 (shown in dashed lines in FIG. 2) relative to the levers 72. The journals 88 are rotatably mounted to two generally triangular pivot plates 94, which are pivotably attached to the left and right side of the bale case 10 through a pair of pivots 96, positioned behind and slightly above the crank drive shaft 78.

According to a known alternative embodiment there can be used a full cam wheel and rubber damping blocks to position the pivot levers.

The journals 88 and pivot plates 94 are forced upwardly by springs 99, of which the one end is attached to the upper half of the plates 94 and the other end to the bale case 10. The plates 94 are held in a first position as shown in full lines in FIG. 2 by a pair of stop bolt assemblies 98, comprising supports, which are affixed to the bale case 10, and stop bolts, interacting with abutments 100 attached to and extending from the lower edge of the pivot plates 94. The bolts and nuts of the assemblies 98 are adjustable to modify this first, uppermost position of the journals 88.

The front portion of the longitudinally extending slots 90 is filled with plugs 106 that are secured to the levers 72 by a rim fitting over the front portion of the slots 90 and by bolt means (not shown).

Opposite to the lever pivots 76 the cranks 74 comprise arms, incorporating cam members 102, which have substantially straight and substantially circular portions, the latter being coaxial with the drive shaft 78. When the cranks 74 are rotated clock-wise as viewed by a person looking at the left of the baler, first the straight portions of the cam members 102 come into contact with rollers 104, which are rotatably connected to the pivot plates 94, and push said plates 94 upwardly, and subsequently the circular portions keep the rollers 104 and the pivot plates 94 in a stationary position. The bolt assemblies 98 are adjusted to almost engage the abutments 100 during the run of the rollers 104 over the circular portion of the cam members 102.

As more fully explained in EP 0 636 308, the combined action of rotating the pivots 76 in a circular path and moving the journals 88 through an arc centred on the stationary pivots 96 in phase with the rotation of the cranks 74 is to cause the tips of the tines 70 to travel along a kidney shaped path shown in dotted lines in FIG. 2 and designated 92.

The tines 70 are shown in FIG. 2 at the point of completion of a stuffer cycle. At this point, a slice of the crop that has been pre-compressed in the intake duct 26 has just been pushed by the tines 70 through the inlet 22 in the bale case and intake duct 26 is being refilled.

Once the desired quantity of crop has been built up in the intake duct 26, the next stuffer cycle is commenced. The tines 70 are retracted from the intake duct 26 and move along the part of the kidney shaped path 92 lying outside intake duct 26 until they arrive at the lower end of the intake duct 26. The tines 70 are then driven back into the intake duct to engage the lower end of the crop slice that has collected within the intake duct 26. The tines 70 then follow the section of the kidney shaped path 92 lying within the intake duct 26 sweeping the slice up through the open inlet 22 into the baling chamber forward of the plunger 20.

The size of the slice transferred into the baling chamber in each cycle of the stuffer is dictated by the point at which the tines 70 re-enter the intake duct at its lower end. Though this size is constant, the mass of crop that the tines have to displace is not constant and varies with the density of the pre-compressed crop material in the intake duct. This density varies with such factors as the type of crop material and the moisture content of the crop material. Further, because a stuffer cycle cannot be commenced at any time at will but has to be synchronised with the movement of the plunger, an excess of crop can be pre-compressed in the intake duct while waiting for the plunger to reach a point in its cycle at which the stuffer cycle can be triggered.

Aside from the variations in the mass of each slice resulting from variations in density, the force needed to push a slice of crop into the baling chamber is affected by the frictional forces between the crop and the surface of the intake duct 26. A crop such as dry hay will thus exhibit much lower friction than, for example, wet grass.

For the reasons given above, despite best efforts being made to avoid blockages in the intake duct, such blockages do occur from time to time. A blockage will occur when the tines cannot exert enough force to push the slice of crop that has been pre-compressed in the intake duct up into the baling chamber. If excessive torque is applied to move the tines 70 against the resistance offered by the crop there is a risk of causing severe damage to the stuffer mechanism. Shear bolts are used to prevent such damage. When the loads exceed the shear force of the bolt, the stuffer is disconnected before its components are damaged. This situation is detected by the control unit of the baler and the operator is alerted of a detected blockage occurring in the intake duct. The shearbolt can be replaced relatively easy, but in certain cases it will not be possible to restart the normal operation of the baler as the stuffer unit will not be able to remove the crop material in the precompression chamber without activating the overload protection. In this case it will cost the operator valuable time to render the baler operable again, because it will be required to clear the intake duct 26 manually before the baler can be restarted. This is a job that requires extensive safety precautions and it is very difficult to gain access to the intake duct 26. According to an alternative known embodiment there could be used overload clutches or other known means to prevent damage to the stuffer unit. They however suffer the same disadvantages as mentioned above.

The present invention is therefore concerned with the problem of how to clear such a blockage once it has been detected and the baler has been brought to a stop. Hitherto, clearing of a blockage in certain circumstances as mentioned above required gaining access to the interior of the duct 26 which, because of its being secured to the bale case at its upper end and having for example a packer 48 at its lower end, was not simple exercise.

The solution that the present invention proposes to solve this problem is to modify the mechanical linkage driving the tines to change the path 92 swept by the ends of the tines 70 in such a manner as to reduce the loading on the tines. Instead of attempting to load the entire contents of the intake duct 26 into the baling chamber in one cycle of the stuffer, only a fraction of the slice is loaded in a modified stuffer cycle. Furthermore during this partial loading cycle the speed and accelerations at which the tines 70 are moved along the intake duct are reduced which results in a reduced load on the stuffer. On return to its normal cycle the stuffer will then be able to cope with such crop as still remains in the intake duct without activating the overload protection or suffering any damage.

In the case of the linkage shown in FIGS. 1 and 2, the desired modification to the path of the tips of the tines 70 can be achieved by moving the position of the journals 88 nearer to the fixed pivot 96.

The journals are not only closer, they are also rotated over a certain angle. This results in the tines following the path designated 92' in FIG. 2. When following the path 92', the tines 70 transfer a partial slice into the baling chamber because the tines enter the intake duct at a point further from the packer unit 48 and nearer to the inlet of the bale case. The shorter length slice will offer less resistance both because of its lower mass and reduced friction. Also, during this partial loading cycle the speed and accelerations at which the tines 70 are moved along the intake duct are reduced, as there is a shorter travel path to complete within the same timeslot, which results in a reduced load on the stuffer. This then allows the intake duct to be partially emptied without the need for it to be cleared manually and without risk of breaking the shear bolt of the stuffer mechanism.

When the journals 88 are then returned to their normal position the remaining crop material in the intake duct will be loaded into the baling chamber, again without risk of breaking the shear bolt of the stuffer mechanism. This can be performed by triggering a further cycle of the stuffer without picking up more crop material. Alternatively the crop remaining in the intake duct may simple form part of the next charge to be loaded into the baling chamber once normal operation is resumed.

Figure 3:
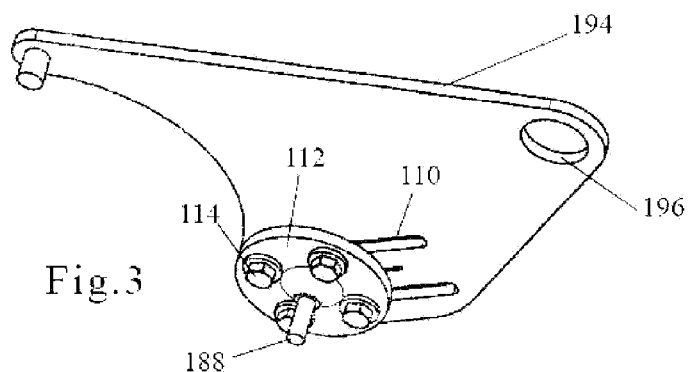
FIGS. 3 to 5 show details of three alternative embodiments of pivot plates of the stuffer shown in FIGS. 1 and 2 in order to implement the present invention.
Figure 4:
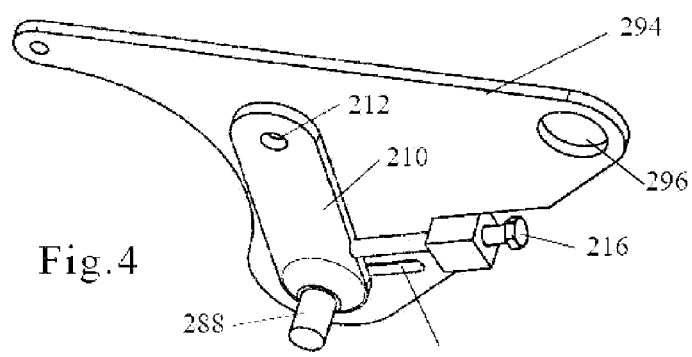
Figure 5:
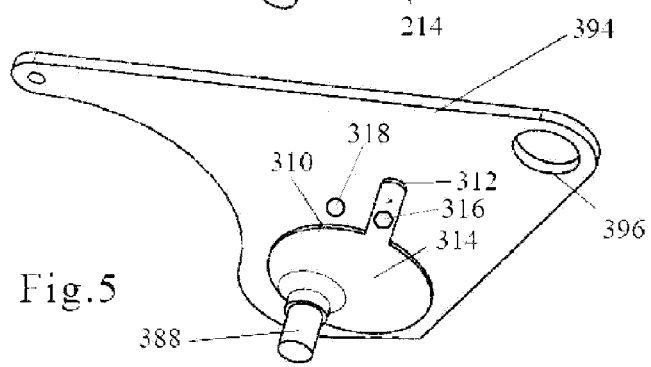

FIGS. 3 to 5 show different ways in which the journals can be repositioned on the pivot plates.

In the embodiment of FIG. 3, the pivot plate 194 is intended as a direct replacement for the pivot plate 94 in FIG. 2. It is pivoted about a pivot 196 but instead of the journal 188 being mounted directly on the pivot plate 194 is mounted on a separate disc 112 that is secured to the plate 194 by bolts 114 passing through elongated slots 110 in the plate 194. Loosening the bolts 114 and moving the disc to the right as viewed will result in the tines 70 tracing the path 92' in FIG. 2 instead of the path 92.

In the embodiment of FIG. 4, the journal 288 is part of a lever arm 210 that is pivotable about a pivot 212 relative to the pivot plate 294 which is also inted as a direct replacement for pivot plate 94 and is pivoted about a pivot 296. A bolt 216 acting on the lever arm 210 can reposition the lever arm 210 to cause the journal 288 to slide to the right as viewed along a guide slot 214 in the pivot plate 294.

In the embodiment of FIG. 5, the journal 388 is formed as an eccentric on a circular disc 314 rotatable within a circular hole 310 in the pivot plate 394. The disc 314 may be rotated by a radial arm 312 and features to retain the disc 314 in one of two preferred orientations such as for example a bolt 316 that interacts with an associated first hole in the pivot plate 394 and can interact with a second hole 318 in the pivot plate 394 when the radial arm 312 is repositioned. As an alternative, if the discs 310 are not circular, it is possible to swap the discs 310 on the opposite sides baler to reposition the journals 388 as required.

Though the above description has concentrated on the manner in which the geometry of the stuffer mechanical linkage taught by EP 0 636 308, it will be clear to the person skilled in the art that other stuffer drive systems, may be modified to reduce the length of intake duct swept by the tines of the stuffer during a stuffer cycle. For example, in GB 2197251, the pivot point of one of the arms connected to lever designated 13 of this patent may be repositioned when it is desired to clear a blockage by loading into the baling chamber only part of the slice accumulated in the intake duct.

The invention as defined in the claims is not limited to the exemplary embodiments that have been described and shown in the Figures, but it can equally comprise combinations and variations that fall within the scope of the claims.

What is claimed is:

1. A method for clearing a blockage in the intake duct of a square baler having a baling chamber with an inlet for the introduction of crop material, an intake duct for transporting crop material to the inlet; and a stuffer comprising tines movable to follow a generally kidney shaped first path to load the crop in the intake duct into the baling chamber through the inlet comprising the steps of:
   detecting a blockage in the intake duct;
   modifying the path of movement of the tines from the first path to a second path in response to the detected blockage whereby only a fraction of the crop material accumulated in the intake duct is loaded into the baling chamber; and
   restoring the path of the tines to the normal path.

2. A method according to claim 1, further comprising loading the remainder of the crop in the intake duct into the baling chamber before feeding new crop material into the intake duct.

3. A method according to claim 1, further comprising
   introducing new crop material into the intake duct;
   loading the new crop material together with the remainder of the crop material that caused the blockage into the baling chamber.

4. A square baler comprising
   a baling chamber with an inlet for the introduction of crop material, an intake duct for transporting crop material to the inlet;
   a stuffer comprising tines movable to follow a generally kidney shaped first path to load the crop in the intake duct into the baling chamber through the inlet and a second path wherein the stuffer is configured to move the tines to enter the duct at a point closer to the inlet than when following the first path whereby only a fraction of the crop material accumulated in the intake duct is loaded into the baling chamber; and
   a mechanical linkage having a variable geometry, wherein the tines of the stuffer are movable by the mechanical linkage to modify the path of the tines between the first and second paths,
   wherein the tines are mounted on levers of which one end is connected for rotation by a crank, the levers engaged by journals mounted on pivot plates that each oscillate about a pivot point in synchronism with the rotating crank to cause the tips of the tines to follow the kidney shaped first path; and in that
   the journals are adjustably mounted on the pivot plates in order to vary the geometry of the mechanical linkage and wherein the journal is closer to the pivot point when the tines are following the second path than the first path.

5. A square baler according to claim 4, wherein each journal forms part of a separate member that is adjustably mounted on the pivot plate.

6. A square baler comprising
   a baling chamber with an inlet for the introduction of crop material, an intake duct for transporting crop material to the inlet;
   a stuffer comprising tines movable to follow a generally kidney shaped first path to load the crop in the intake duct into the baling chamber through the inlet and a second path whereby only a fraction of the crop material accumulated in the intake duct is loaded into the baling chamber; and
   a mechanical linkage having a variable geometry, wherein the tines of the stuffer are movable by the mechanical linkage to modify the path of the tines between the first and second paths;
   wherein the tines are mounted on levers of which one end is connected for rotation by a crank, the levers engaged by journals mounted on pivot plates that each oscillate about a pivot point in synchronism with the rotating crank to cause the tips of the tines to follow the kidney shaped first path; and in that the journals are adjustably mounted on the pivot plates in order to vary the geometry of the mechanical linkage;
   wherein the journal forming part of a separate member that is adjustably mounted on the pivot plate; and
   wherein the separate member is a disc retained by bolts engaged in elongated slots in the pivot plate.

7. A square baler as claimed in claim 5, wherein the separate member is a lever pivotally mounted on the pivot plate.

8. A square baler as claimed in claim 5, wherein the separate member is a repositionable disc retained in a hole in the pivot plate.

* * * * *